I. P. Tice,
Wood Molding Machine,
N° 24,163.                     Patented May 24, 1859.

Witnesses:                      Inventor:
                                Isaac P. Tice

UNITED STATES PATENT OFFICE.

ISAAC P. TICE, OF BALTIMORE, MARYLAND.

MACHINE FOR CUTTING IRREGULAR FORMS.

Specification of Letters Patent No. 24,163, dated May 24, 1859.

*To all whom it may concern:*

Be it known that I, ISAAC P. TICE, of Baltimore, in the county of Baltimore and State of Maryland, have invented a new and Improved Machine for Cutting Wave-Moldings; and I do hereby declare that the following is a full, clear, and exact description of the same, reference being had to the annexed drawings, making a part of this specification, in which—

Figure 2:
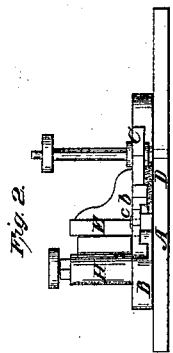
Figure 1:
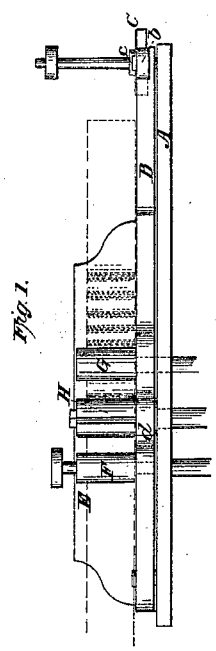
Figure 3:
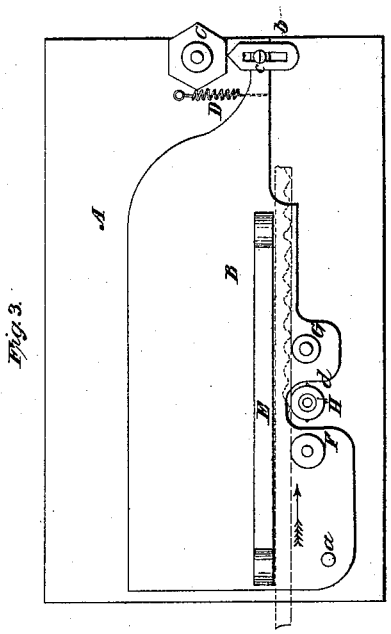

Figure 1, is a side view of my invention. Fig. 2, an end view of ditto. Fig. 3, a plan or top view of ditto.

Similar letters of reference indicate corresponding parts in the several figures.

The object of this invention is to obtain a simple machine for cutting waved moldings, one that may be operated or manipulated with facility and work rapidly and in a perfect manner. This object is attained by having a fence or gage, as well as a feed and pressure roller, attached to a vibrating bed, and using in connection therewith a rotary cutter head, which is fitted in permanent or vibrating bearings, the whole being arranged to operate as hereinafter fully shown and described.

To enable those skilled in the art to fully understand and construct my invention I will proceed to describe it.

A, represents a platform or table supported at a suitable height in any proper way, and B, is a bed which is secured on said platform, by means of a pivot $a$. To one end of the bed B, an adjustable bar $b$, is attached by a set screw $c$, and one end of this bar is made to bear against a rotating cam C, by means of a spring D, see more particularly Fig. 3.

On the bed B, a gage or fence E, is secured, and on the bed a feed roller F, and pressure roller G, is placed, the feed roller being rotated by any proper means.

On the platform or table A, a cutter head H, is placed, and rotated in any proper way. This cutter head is between the two rollers F, G, a recess or groove $d$, being made in the bed so that the cutter head cannot interfere with the bed. This will be understood by referring to Fig. 3.

The operation of the machine is as follows: The cam C, cutter head H, and feed roller F, are rotated and the stuff, shown in red, to be operated upon is placed between the fence or gage E, and the feed roller F, the latter by its rotation feeding the stuff past the cutter H, which in consequence of a vibrating movement given the bed B, by the cam C, and spring D, cuts the stuff in wave-form.

The form or pattern of the wave to be cut on the molding may be varied according to the form of the cam C, as the vibration of the bed produces the wave cut, and if the vibrations are equal or regular, the stuff will be cut with waves of uniform size. If however the cam C, be so formed as to cause irregular or uneven vibrations of the bed B, the waves will be cut correspondently. The depth of the waves or cuts may be made greater or less by adjusting the bar $b$, at the end of the bed B.

This machine may be constructed at a small cost, is extremely simple, not liable to get out of repair and will work rapidly and well.

I would remark that the bearings of the cutter head H, may be made to vibrate if desired. In the latter case, the length of the vibration of the bed would be measurably reduced, and the character of the work might be more varied than if the bed alone vibrated.

Having thus described my invention what I claim as new and desire to secure by Letters Patent, is,—

The employment or use of the vibrating bed B, with fence or gage E, and feed and pressure rollers F, G, attached, in connection with the rotary cutter head H, fitted in stationary bearings on the platform or table, the whole being arranged to operate substantially as and for the purpose set forth.

ISAAC P. TICE.

Witnesses:
 WM. TUSCH,
 J. F. BUCKLEY.